United States Patent [19]

Foley et al.

[11] 3,899,524

[45] Aug. 12, 1975

[54] COMPLEX ORGANO SILICON COMPOUNDS

[75] Inventors: Kevin M. Foley, Hebron; Francesco M. Vigo, Heath, both of Ohio

[73] Assignee: Owens-Corning Fiberglas Corporation, Toledo, Ohio

[22] Filed: Apr. 2, 1973

[21] Appl. No.: 347,264

[52] U.S. Cl. ............... 260/448.8 R; 117/126 GS; 117/126 GN; 260/348 SC
[51] Int. Cl. .............................................. C07f 7/18
[58] Field of Search ............................ 260/448.8 R

[56] References Cited
UNITED STATES PATENTS

| | | | |
|---|---|---|---|
| 2,496,335 | 2/1950 | Christ.......................... | 260/448.8 R |
| 2,730,532 | 1/1956 | Martin ..................... | 260/448.8 R X |
| 2,883,395 | 4/1959 | Rogers et al. ............ | 260/448.8 R X |
| 3,369,006 | 2/1968 | Brown...................... | 260/448.8 R X |

*Primary Examiner*—Paul F. Shaver
*Attorney, Agent, or Firm*—Carl G. Staelin; John W. Overman; Keith V. Rockey

[57] ABSTRACT

This invention is addressed to complex organo silicon compounds prepared by reaction of a halosilane, an alkylene oxide and a complex epoxide containing at least one other functional group. The products of this invention are liquid organosilicon compounds which are useful in the treatment of glass fibers to improve the bonding relationship between glass fibers and resinous or elastomeric materials.

49 Claims, No Drawings

COMPLEX ORGANO SILICON COMPOUNDS

This invention relates to organo silicon compounds, and more particularly to complex organo silicon compounds which are resistant to hydrolysis.

Organo silicon compounds have found widespread use in a variety of applications, and have been found to be particularly well suited for use in the treatment of highly hydrophilic substrates, such as glass and glass fibers, to render the hydrophilic substrates more compatible with hydrophobic systems. Thus, in the manufacture of glass fiber reinforced plastics and glass fiber reinforced elastomeric products such as drive belts, rubber tires and the like, it has been the practice to treat the glass fibers with organo silicon compounds.

The organo silicon compounds frequently used for this purpose are the organo silanes of the formula

(1)

wherein R is an organic group which may contain any of a variety of functional groups, such as amino, epoxy, hydroxy, mercapto, etc., and R' is an alkyl group. While such silanes as well as their hydrolysis products and polymerization products are quite effective in promoting a secure bonding relationship between glass fibers and resins and elastomeric materials, they are nevertheless expensive to manufacture and consequently contribute to the overall costs in the manufacture of glass fiber reinforced resins and elastomeric materials.

It is known, as shown by U.S. Pat. No. 2,650,934, that an alkylene oxide can be reacted with silicon tetrahalides such as silicon tetrachloride as follows:

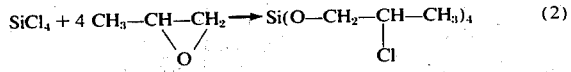

(2)

While this reaction is known, it has only recently been discovered that the tetrakis alkoxy silane produced is resistant to hydrolysis in aqueous media. Without limitation as to theory, it is believed that the halogen atom in the betaposition serves to stabilize the bond between the alkoxy group and the silicon atom.

It has also been suggested that silanized epoxide resins can be prepared by reaction of an epoxide resin with an organo silane in the presence of an amine. In this reaction, which is disclosed in U.S. Pat. No. 3,169,884, the product does not contain the stabilized

(3)

group.

It is an object of the present invention to produce complex organo silicon compounds which contain betahaloalkoxy groups attached directly to the silicon atoms which stabilize the compounds against hydrolysis.

It is a more specific object of this invention to produce organo silicon compounds which contain highly reactive functional groups along with beta-haloalkoxy groups for use in the treatment of highly hydrophilic substrates to render such substrates more hydrophobic.

The concepts of this invention reside in complex organo silicon compounds which are prepared by reaction of a halosilane with at least one alkylene oxide and at least one other organo epoxide containing at least one other functional group. As will be appreciated by those skilled in the art, the nature of the product depends not only upon the specific combination of epoxides employed but also upon the reactant proportions. In all cases, however, the reaction product includes a mixture of compounds which can be utilized as such or, if desired, the predominant compounds forming the reaction product can be separated in relatively pure form.

As the other epoxide, use is preferably made of organic epoxides containing at least one other functional group. By way of illustration, the following compounds can be employed:

[1] Epoxides of the formula

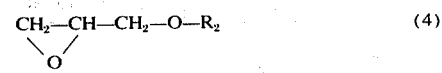

(4)

wherein $R_2$ is an aryl group such as phenyl or phenyl substituted with an amino group, a halogen group, an alkyl group; alkyl containing 1 to 20 carbon atoms and substituted derivatives thereof; an alkenyl group containing 2 to 8 carbon atoms (e.g., vinyl, allyl, etc.); styrene oxide; a group having the formula

(5)

wherein R' is hydrogen or methyl. Illustrative of such epoxides are phenyl glycidyl ether, cresyl glycidyl ether, allyl glycidyl ether, glycidyl acrylate, glycidyl methacrylate, a mixture of n-octyl and n-decyl glycidyl ethers (Epoxide No. 7 from Procter and Gamble) and a mixture of n-dodecyl and n-tetradecyl glycidyl ethers (Epoxide No. 8 from Procter and Gamble).

[2] Epoxides of the formula

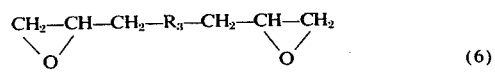

(6)

wherein $R_3$ is a divalent organic radical such as alkylene containing 1 to 10 carbon atoms; alkyleneoxyalkylene containing 2 to 20 carbon atoms; oxyalkyleneoxy containing 1 to 10 carbon atoms; oxyalkyleneoxyalkyleneoxy containing 2 to 20 carbon atoms; divalent aromatic groups such as a group of the formula

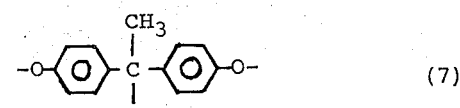

(7)

or

(8)

A number of such epoxides are commercially available from Dow and Ciba and include the following:

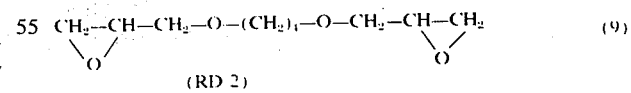

(9)

(RD 2)

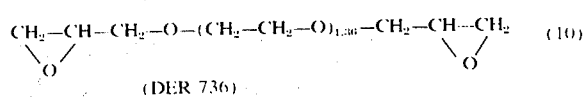

(10)

(DER 736)

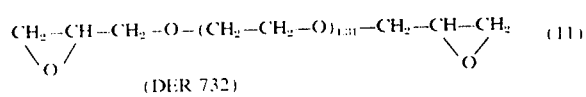

(11)

(DER 732)

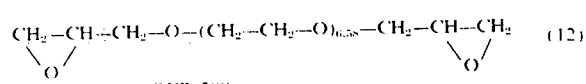

(12)

(DER 508)

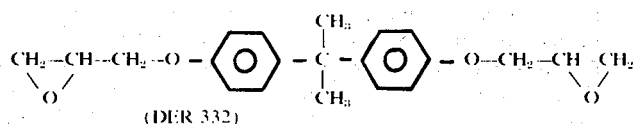
(DER 332)

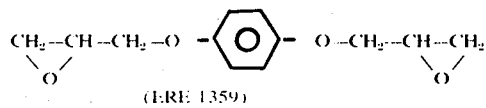
(ERE 1359)

[3] Cycloalkane epoxides, including the following:

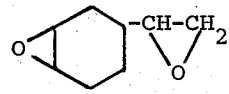

(RD 4 or ERL 4206)    (15)

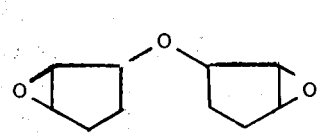

(ERR 4205)    (16)

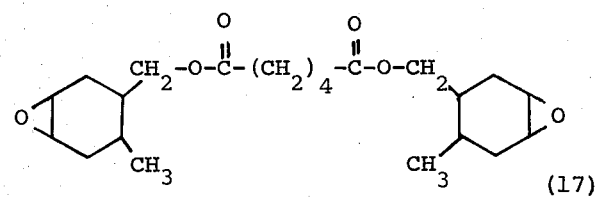

(ERR 4289)    (17)

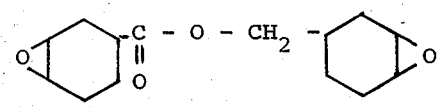

(ERR 4221)    (18)

In accordance with one embodiment of the invention, the organo silicon compounds are prepared by reaction of from 1 to 3 epoxide equivalents of the alkylene oxide and at least 0.5 and up to 3 epoxide equivalents of the epoxide containing a functional group per mole of the silicon tetrahalide. As used herein, the term "epoxide equivalent" refers to the number of moles of the epoxide divided by the number of epoxide groups per molecule. Thus, this reaction may be illustrated by the following:

wherein X represents halogen, $R_4$ is hydrogen or $C_1$ to $C_4$ alkyl (e.g., methyl, ethyl, propyl, etc.), and $R_5$ is hydrogen or $C_1$ to $C_4$ alkyl, and preferably hydrogen, a represents the epoxide equivalent of the alkylene oxide and b represents the epoxide equivalent of the epoxide containing a functional group

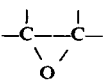    (20)

In actual practice, the reaction products produced is a mixture of compounds which can be utilized as such without the need to separate specific compounds contained in the reaction product.

However, compounds contained in the reaction mixture can be, if desired, separated from the mixture by known techniques, such as fractional distillation, liquid chromatography, etc., to yield the substantially pure compounds. Such compounds frequently depend upon the epoxide equivalents employed, that is, the values of a and b. For example, when the reaction mixture contains about 2 to 3 epoxide equivalents of the alkylene oxide and about 1 to 2 epoxide equivalents of the epoxide containing the functional group, the reaction product includes the following compounds:

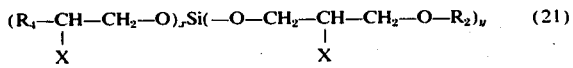    (21)

wherein x is an integer from 2 to 3 and y is an integer from 1 to 2, and

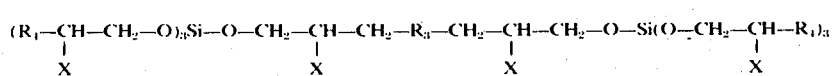

(22)

wherein x is 3 and y is 1 and where X, $R_2$, $R_3$ and $R_4$ are as described above, as well as the corresponding derivatives where the epoxide is a cyclohexane epoxide.

Examples of specific compounds which can be prepared in accordance with the present invention include the following:

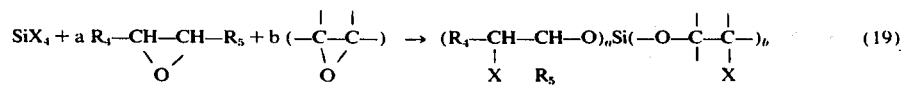

(19)

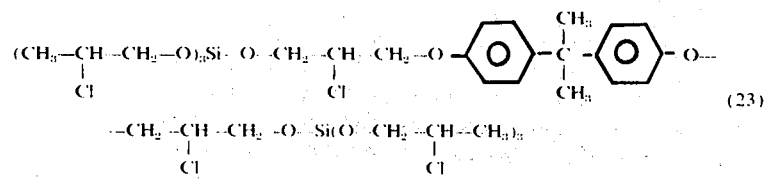

(23)

(SiCl₄ 1 mole; propylene oxide 3 equivalents; DER 332 1 equivalent)

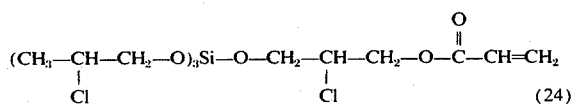
(24)

(SiCl₄ 1 mole; propylene oxide 3 equivalents; glycidylacrylate 1 equivalent)

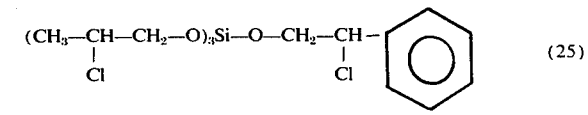
(25)

(SiCl₄ 1 mole; propylene oxide 3 equivalents; styrene oxide 1 equivalent)

$(CH_3-CH-CH_2-O)_3Si-O-CH_2-CH-CH_2-O-CH_2-CH=CH_2$ (26)
with Cl substituents (SiCl₄ 1 mole; propylene oxide 3 equivalents; allylglycidyl ether 1 equivalent)

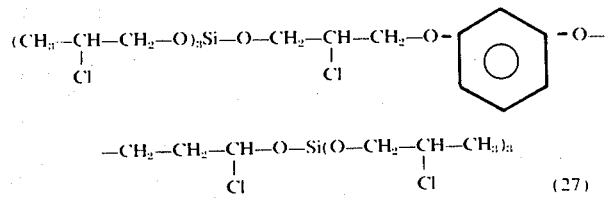
(27)

(SiCl₄ 1 mole; propylene oxide 3 equivalents; ERE 1359 1 equivalent)

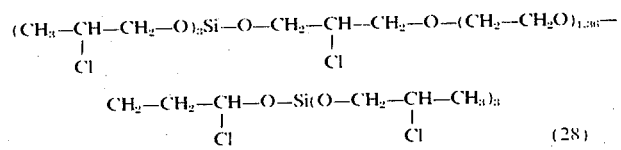
(28)

(SiCl₄ 1 mole; propylene oxide 3 equivalents; DER 736 1 equivalent)

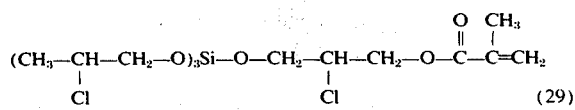
(29)

(SiCl₄ 1 mole; propylene oxide 3 equivalents; glycidyl methacrylate 1 equivalent)

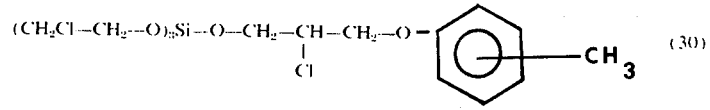
(30)

(SiCl₄ 1 mole; ethylene oxide 3 equivalents; cresyl glycidyl ether 1 equivalent)

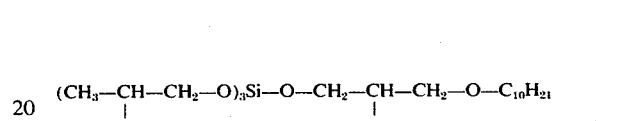
(31)

(SiCl₄ 1 mole; propylene oxide 3 equivalents; decyl glycidyl ether 1 equivalent)

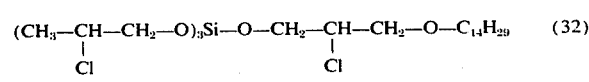
(32)

(SiCl₄ 1 mole; propylene oxide 3 equivalents; tetradecyl glycidyl ether 1 equivalent)

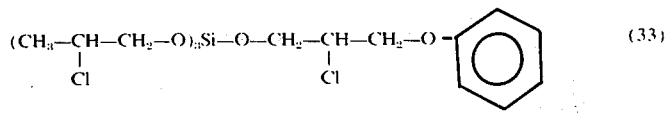
(33)

(SiCl₄ 1 mole; propylene oxide 3 equivalents; phenylglycidyl ether 1 equivalent)

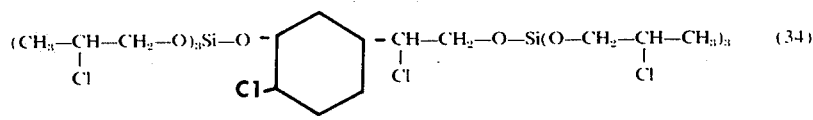
(34)

(SiCl₄ 1 mole; propylene oxide 3 epoxide equivalents; RD 4 1 epoxide equivalent)

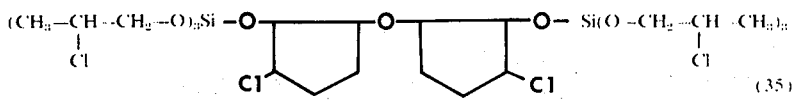

(SiCl₄ 1 mole; propylene oxide 3 epoxide equivalents; ERR 4205 1 epoxide equivalent)

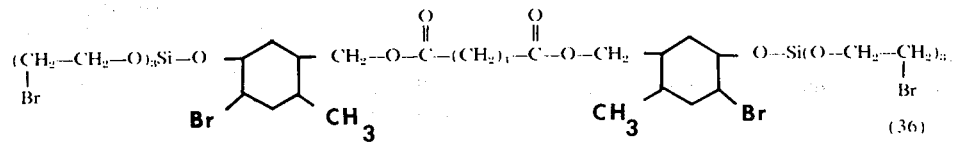

(SiBr₄ 1 mole; ethylene oxide 3 epoxide equivalents; ERR 4289 1 epoxide equivalent)

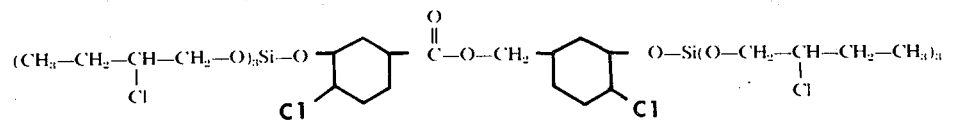

(SiCl₄ 1 mole; butylene oxide 3 epoxide equivalents; ERR 4221 1 epoxide equivalent)

$$(CH_3-CH-CH_2O)_2Si(O-CH_2-CH-CH_2-O-C-C=CH_2)_2$$
$$\phantom{XXX}|\phantom{XXXXXXXXXXXXX}|\phantom{XXXXXXXX}\|\phantom{X}|$$
$$\phantom{XXX}Cl\phantom{XXXXXXXXXXXX}Cl\phantom{XXXXXX}O\phantom{X}CH_3$$

(38)

(SiCl₄ 1 mole; propylene oxide 2 epoxide equivalents; glycidylmethacrylate 2 epoxide equivalents)

$(CH_3-CH-CH_2-O)_2Si(O-CH_2-CH-CH_2-O-CH_2-CH=CH_2)_2$
$\phantom{XX}|\phantom{XXXXXXXXXXXXXX}|$
$\phantom{XX}Cl\phantom{XXXXXXXXXXXX}Cl$ (39)

(SiCl₄ 1 mole; propylene oxide 2 epoxide equivalents; allylglycidyl ether 2 epoxide equivalents)

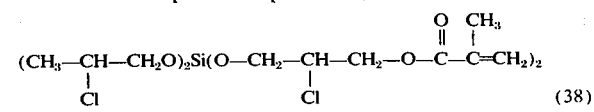

(SiCl₄ 1 mole; ethylene oxide 2 epoxide equivalents; glycidylphenyl ether 2 epoxide equivalents)

Where the epoxide containing the functional group includes two or more epoxide groups, it is generally preferred that the equivalents of the alkylene oxide $a$ be at least 2.2 and preferably at least 2.5 to avoid polymer formation which leads to gelling of the reaction product.

In preparing the reaction mixtures of the present invention, the reactants are contacted in the liquid phase. An inert organic solvent can be employed, if desired, but is not essential to the practice of the invention. The reaction temperature is not critical. The reaction generally takes place spontaneously and evolves heat. Best results are usually achieved when the reaction temperature is maintained below 100°C, such as within the range of 0° to 100°C.

Where the epoxide containing the functional group

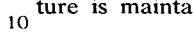

(35)

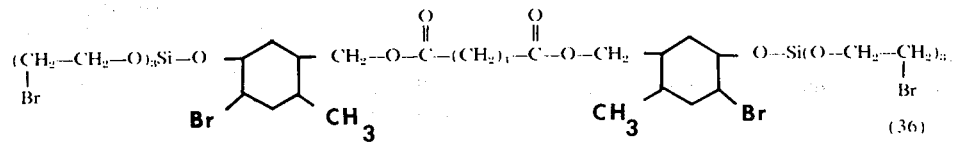

(36)

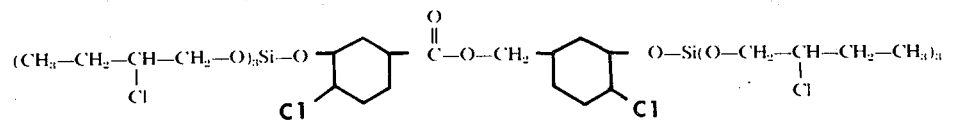

(37)

as described above contains two or more epoxide groups, it is frequently preferred that the alkylene oxide be added to the halosilane prior to the time that the diepoxide is added to the reaction mixture. This procedure has the advantage that the reaction of alkylene oxide with the silicon tetrahalide is quite exothermic and thus raises the temperature of the reaction medium to a level suitable for addition of the epoxide containing the functional grouping.

Where the epoxide containing the functional group is a monoepoxide, the alkylene oxide or the monoepoxide can be added to the reaction mixture before the other, or they may be added simultaneously.

Where the reaction mixture contains 2 or more equivalents of an epoxide containing 2 or more epoxide groups per molecule, the reaction product includes compounds in which one of the epoxide groups in the functional epoxide remains unreacted with the silicon tetrahalide. For example, when the functional epoxide is one of those defined by (6) above, the reaction product includes compounds

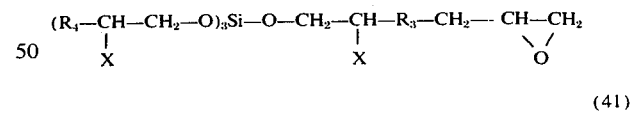

(41)

where R₃, R₄, R₅ and X are as described above.
Such compounds include the following:

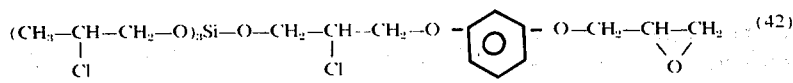

(42)

(SiCl₄ 1 mole; propylene oxide 3 equivalents; ERE 1359 2 equivalents)

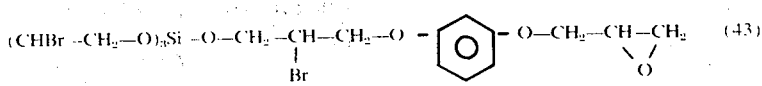

(43)

(SiBr₄ 1 mole; ethylene oxide 2 equivalents; ERE 1359 2 equivalents)

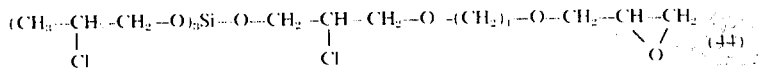

(SiCl₄ 1 mole; propylene oxide 2 equivalents; RD 4 2 equivalents)

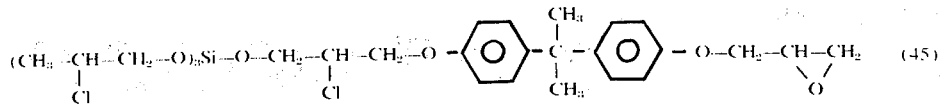

(SiCl₄ 1 mole; propylene oxide 2 equivalents; DER 332 2 equivalents)

It will be observed that in all of the compounds specifically described above, with the exception of the product prepared from styrene oxide, each bond to the silicon atom contains a beta-haloalkoxy group. As indicated above, it is believed that such groupings impart improved stability to the compounds of the invention.

In accordance with another concept of the present invention, all or a part of the alkylene oxide reactant can be substituted by an alcohol, and preferably a monohydric alcohol. For this purpose, use can be made of an alkanol

ROH where R is alkyl containing 1 to 6 carbon atoms. However, a variety of other alcohols may likewise be employed including benzyl alcohol, allyl alcohol, alkanol amines containing 2 to 6 carbon atoms such as ethanolamine, propanolamine, butanolamine, etc. as well as numerous other alcohols.

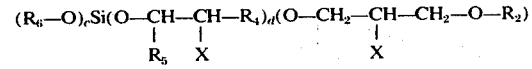

and

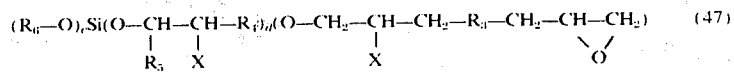

where $R_6$ is alkyl containing 1 to 6 carbon atoms derived from the alkanol, benzyl, allyl or aminoalkyl containing 2 to 6 carbon atoms, derived from the alkanolamine, $R_3$, $R_4$, $R_5$ and X are as described above; and c is the number of hydroxy equivalents used, which ranges from 1 to 3, and d is the number of epoxide equivalents of the alkylene oxide, which ranges from 0 to 2. As will be appreciated by those skilled in the art, c + d is usually equal to 3.

In the practice of this concept of the invention, it is frequently preferred to just react the silicon tetrahalide with the alcohol, then with the alkylene oxide (where an alkylene oxide is employed) and then with the epoxide containing a functional group as defined above. Where, however, the epoxide containing the functional group is a monoepoxide, all of the reactants can be added simultaneously or in any desired order.

The reaction product is generally a mixture of compounds depending on the nature of the reactants and proportions. It is generally preferred that the reaction mixture contain 1 to 3 moles of the alcohol, 0 to 2 epoxide equivalents or more of the alkylene oxide and 0.5 to 3.0 epoxide equivalents of the epoxide containing a functional group per mole of SiX₄. Where the latter is a diepoxide, it is preferred that the total of the moles of alcohol and alkylene oxide be at least 2.1 and preferably at least 2.5 to minimize polymer formation and gelling of the reaction product.

Specific compounds of this type include:

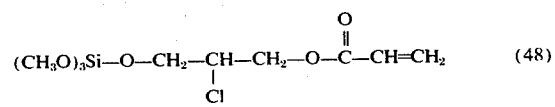

(SiCl₄ 1 mole; CH₃OH 3 hydroxy equivalents; glycidylacrylate 1 epoxide equivalent)

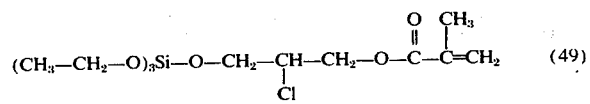

(SiCl₄ 1 mole; C₂H₅OH 3 hydroxy equivalents; glycidylmethacrylate 1 epoxide equivalent)

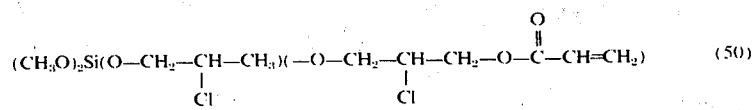

(SiCl₄ 1 mole; CH₃OH 2 hydroxy equivalents; propylene oxide 1 epoxide equivalent; glycidylacrylate 1 epoxide equivalent)

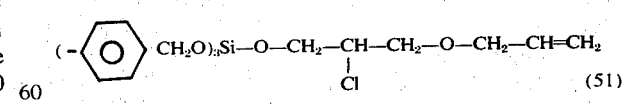

(SiCl₄ 1 mole; benzyl alcohol 3 hydroxy equivalents; allylglycidyl ether 1 epoxide equivalent)

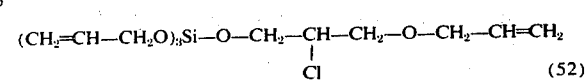

(SiCl₄ 1 mole; allyl alcohol 3 hydroxy equivalents; allylglycidyl ether 1 epoxy equivalent)

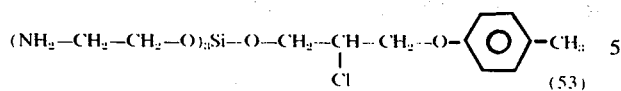
(53)

(SiCl₄ 1 mole; ethanol amine 3 hydroxy equivalents; cresyl glycidyl ether 1 epoxide equivalent)

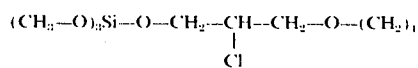

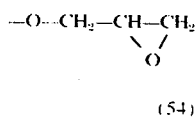
(54)

(SiCl₄ 1 mole; CH₃OH 3 hydroxy equivalents; RD 2 2 epoxide equivalents)

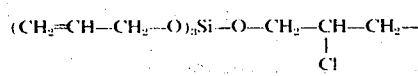

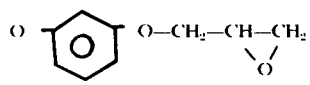
(55)

(SiCl₄ 1 mole; allyl alcohol 3 hydroxy equivalents; ERE 1359 2 epoxide equivalents)

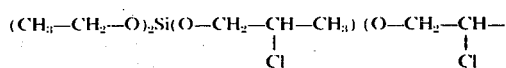

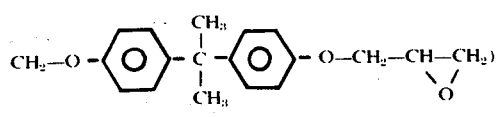
(56)

(SiCl₄ 1 mole; C₂H₅OH 2 hydroxy equivalents; propylene oxide 1 epoxide equivalent; DER 332 2 epoxide equivalents)

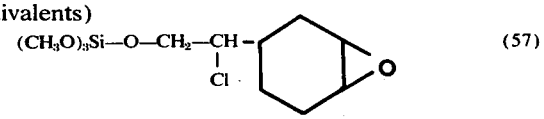
(57)

(SiCl₄) 1 mole; CH₃OH 3 hydroxy equivalents; RD 4 2 epoxide equivalents)

As will be appreciated by those skilled in the art, where the epoxide containing a functional group which is employed in this embodiment of the invention is a diepoxide, the nature of the product can be changed by increasing the amount of such diepoxide up to 1.8 epoxide equivalents per mole of the silicon tetrahalide. The reaction product, which is still a mixture, has been found to contain compounds of the following type:

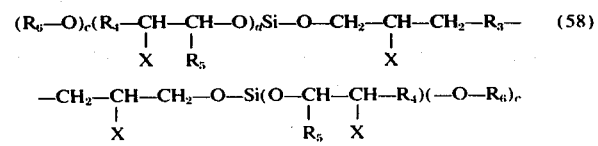
(58)

Specific compounds of this type include:

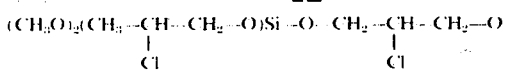

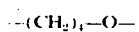

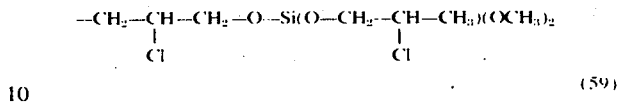
(59)

(SiCl₄ 1 mole; CH₃OH 2 hydroxy equivalents; propylene oxide 1 epoxide equivalent; RD 2 1 epoxide equivalent)

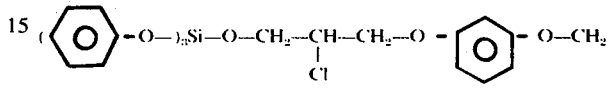

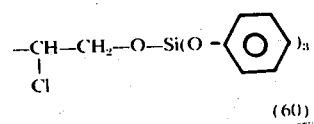
(60)

(SiCl₄ 1 mole; benzyl alcohol 3 hydroxy equivalents; ERE 1359 1 epoxide equivalent)

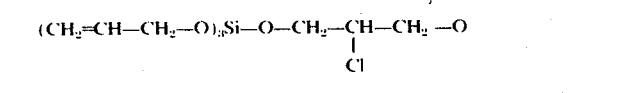

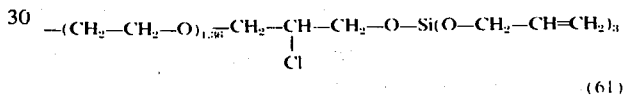
(61)

(SiCl₄ 1 mole; allyl alcohol 3 hydroxy equivalents; DER 736 1 epoxide equivalent)

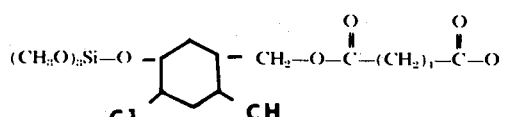
(62)

(SiCl₄ 1 mole; CH₃OH 3 hydroxy equivalents; ERR 4289 2 epoxide equivalents)

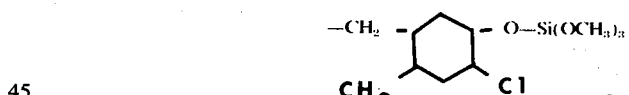
(63)

(SiCl₄ 1 mole; CH₃CH₂OH 3 hydroxy equivalents; RD 4 2 epoxide equivalents)

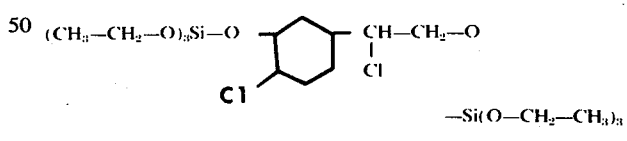

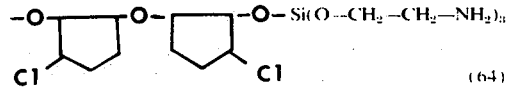
(64)

(SiCl₄ 1 mole; ethanolamine 3 hydroxy equivalents; ERR 4205 2 epoxide equivalents)

In accordance with yet another embodiment of the invention, the halosilane employed in the reaction can contain one or more organo groups attached directly to the silicon atom through a carbon-to-silicon bond. In the preferred practice of this embodiment of the invention, the halosilane is of the formula $$(R_7)_n SiX_{(4-n)}$$

wherein $R_7$ is an organic group containing 1 to 20 carbon atoms, n is an integer from 1 to 2 and X is halogen and preferably chlorine or bromine.

$R_7$ is preferably alkyl containing 1 to 20, and preferably 1 to 6 carbon atoms (e.g., methyl, ethyl, propyl, isopropyl, lauryl, etc.); alkenyl containing 2 to 20 and preferably 2 to 6 carbon atoms (e.g. vinyl, allyl, 3-butenyl, 4-pentenyl, etc.), cycloalkyl, such as cyclopentyl, cyclohexyl, etc., phenyl, as well as substituted derivatives thereof.

Where the organo halosilanes described above are reacted with an alkylene oxide and an epoxide containing a functional group as described above, it is preferred to employ from 1 to 2.5 epoxide equivalents or moles of the alkylene oxide per mole of the halosilane and from 0.5 to 3 epoxide equivalents of the epoxide containing the functional group per mole of the halosilane. Where the latter epoxide contains two epoxide groups and n = 1, it is desirable to employ at least 1.2 and preferably at least 1.5 epoxide equivalents of the alkylene oxide to minimize gel formation.

As is the case in the embodiments described above, the reaction product is usually in the form of a mixture of compounds. However, compounds which can be separated from the reaction products include:

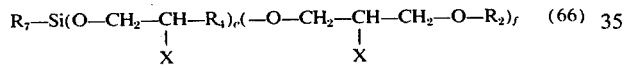

(66)

where $R_7$, $R_4$, $R_2$ and X are as described above and e is an integer from 1 to 2, and f is an integer from 1 to 2, with the total of e and f being equal to 3 where n is 1, and to 2 where n is 2;

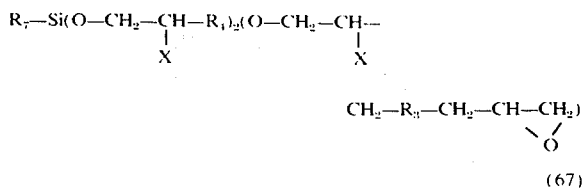

(67)

and/or

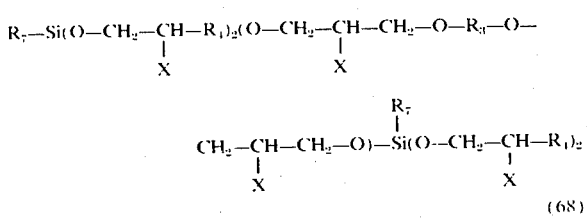

(68)

Specific compounds which can be prepared in accordance with the concepts of the invention include:

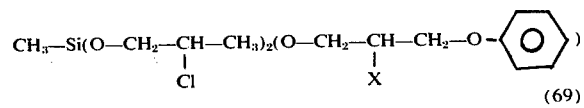

(69)

($CH_3SiCl_3$ 1 mole; propylene oxide 2 epoxide equivalents; glycidyl phenyl ether 1 epoxide equivalent)

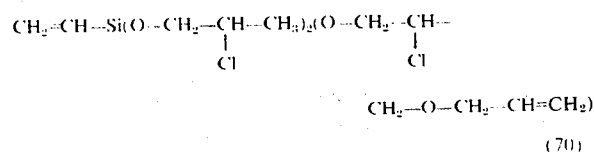

(70)

($CH_2=CHSiCl_3$ 1 mole; propylene oxide 2 epoxide equivalents; allylglycidyl ether 1 epoxide equivalent)

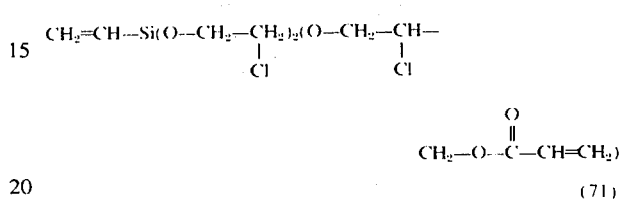

(71)

($CH_2=CHSiCl_3$ 1 mole; propylene oxide 1 epoxide equivalent; glycidyl acrylate 1 epoxide equivalent)

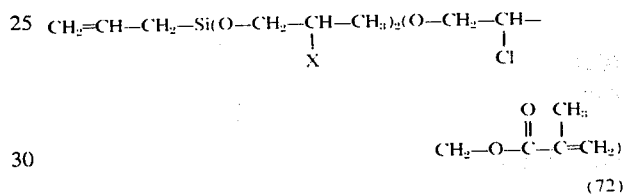

(72)

(allyltrichlorosilane 1 mole; propylene oxide 2 epoxide equivalents; glycidylmethacrylate 1 epoxide equivalent)

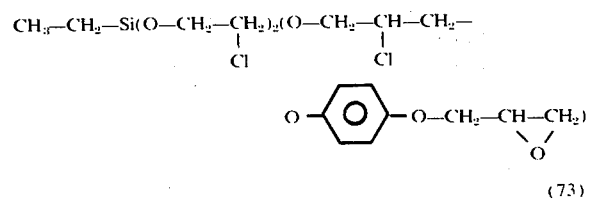

(73)

(ethyltrichlorosilane 1 mole; propylene oxide 2 epoxide equivalents; ERE 1359 2 epoxide equivalents)

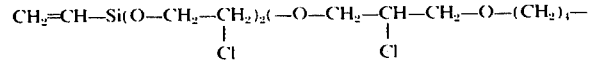

(74)

($CH_2=CHSiCl_3$ 1 mole; ethylene oxide 1 epoxide equivalent; RD 2 2 epoxide equivalents).

As will be appreciated by those skilled in the art, the alkylene oxide can be replaced in whole or in part by a monohydric alcohol of the type described above. In general, it is preferred to employ from 1 to 2 moles of the alcohol and 0 to 2 moles of the alkylene oxide per mole of the organo silane. The order of reaction is not critical, but it is frequently preferred to react the alcohol and/or alkylene oxide with the silane prior to reaction with the epoxide when the latter contains 2 or more epoxide groups per mole.

The reaction product is generally a mixture of compounds; however, compounds which are included in the mixture and which can be separated therefrom include compounds such as

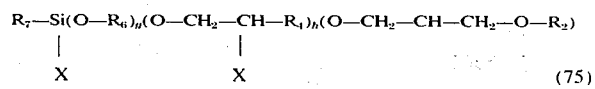
(75)

wherein $R_2$, $R_4$, $R_6$, $R_7$ and X are as described above, g is an integer from 1 to 2 and h is an integer from 0 to 1.

Specific compounds which can be prepared in accordance with this embodiment include:

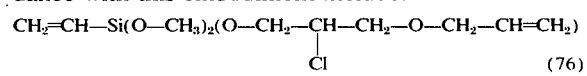
(76)

($CH_2$=$CHSiCl_3$ 1 mole; $CH_3OH$ 2 moles; allylglycidyl ether 1 mole)

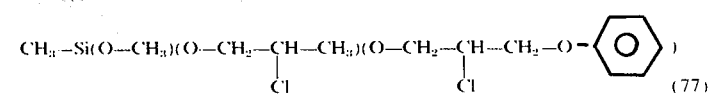
(77)

($CH_3SiCl_3$ 1 mole; $CH_3OH$ 1 mole; propylene oxide 1 mole; phenyl glycidyl ether 1 mole)

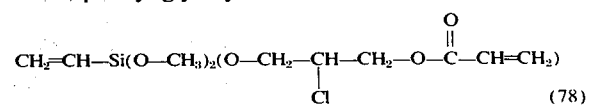
(78)

($CH_2$=$CHSiCl_3$ 1 mole; $CH_3OH$ 2 moles; glycidylacrylate 1 mole)

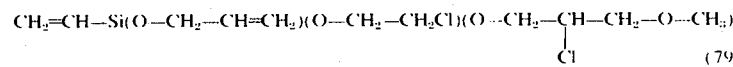
(79)

($CH_2$=$CHSiCl_3$ 1 mole; allyl alcohol 1 mole; ethylene oxide 1 mole; methyl glycidyl ether 1 mole)

Where the epoxide contains two epoxy groups per mole, the compounds include:

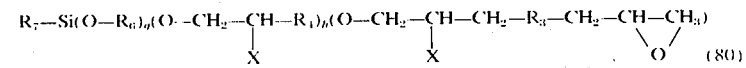
(80)

and/or

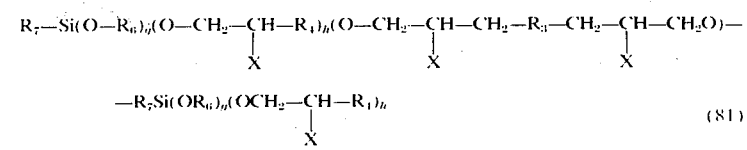
(81)

Specific compounds include:

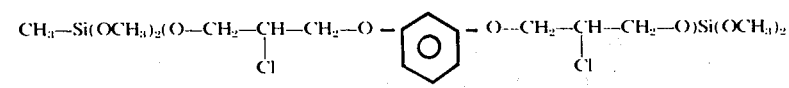
(82)

($CH_3SiCl_3$ 1 mole; $CH_3OH$ 2 moles; ERE 1359 1 epoxide equivalent)

(83)

($CH_2$=$CHSiCl_3$ 1 mole; $CH_3OH$ 1 mole; propylene oxide 1 mole; DER 332 1 epoxide equivalent)

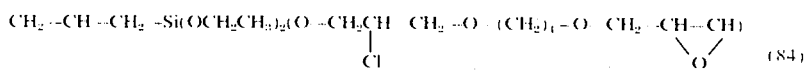
(84)

($CH_2$=$CHSiCl_3$ 1 mole; $CH_3CH_2OH$ 2 moles; RD 2 2 epoxide equivalents).

If desired, in the practice of this embodiment of the invention, the reaction can be carried out using a monoepoxide containing a functional group alone. This reaction frequently produces specific compounds but can also result in mixtures. Compounds produced include the following types:

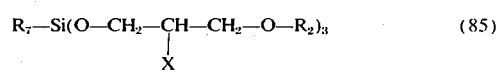
(85)

Representative of specific compounds include the following:

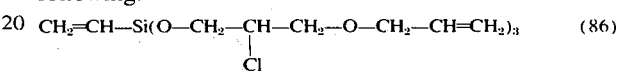
(86)

($CH_2$=$CHSiCl_3$ 1 mole; allylglycidyl ether 3 epoxide equivalents)

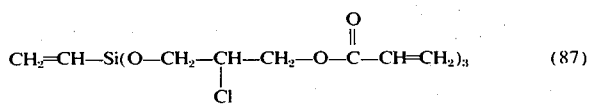
(87)

($CH_2$=$CHSiCl_3$ 1 mole; glycidylacrylate 3 epoxide equivalents)

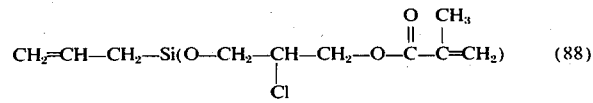
(88)

(allyltrichlorosilane 1 mole; glycidylmethacrylate 3 epoxide equivalents)

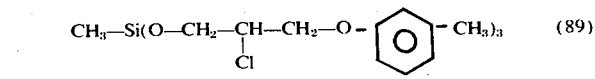
(89)

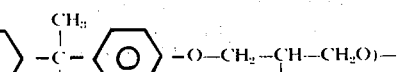

(CH₃SiCl₃ 1 mole; cresyl glycidyl ether 3 epoxide equivalents)

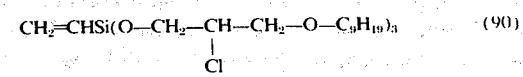

(CH₂=CHSiCl₃ 1 mole; Epoxide No. 7 3 epoxide equivalents)

The compounds and mixtures of compounds produced in accordance with the concepts of this invention can be used in a wide variety of applications in which the organo silicon compounds described in formula (1) above have been used. It has been found that the organo silicon compounds of this invention are effective in the treatment of glass fibers to improve the bonding relationship between glass fibers and resinous plastics and elastomeric materials. For example, the compounds of this invention or the mixtures of compounds produced in accordance with this invention can be applied as a thin coating to individual glass fiber filaments and the coated glass fiber filaments can then be employed as reinforcement for resins and elastomeric materials. Alternatively, the compounds and mixtures of compounds prepared in accordance with this invention can be formulated into impregnating compositions for use in the impregnation of bundles of glass fibers for reinforcement of elastomeric materials as in the manufacture of glass fiber reinforced elastomeric products including rubber tires, drive belts, timing belts, etc.

Having described the basic concepts of the present invention, reference is now made to the following examples which are provided by way of illustration, and not by way of limitation, of the practice of this invention.

EXAMPLE 1

Into a round bottom flask equipped with a stir rod, a thermometer and a reflux condenser, there is introduced 1 mole of silicon tetrachloride. Thereafter, 3 moles of propylene oxide are slowly added to the reaction which is accompanied by the evolution of heat. After addition of the propylene oxide, 0.5 mole (1 epoxide equivalent) of the diepoxide DER 332 (compound No. 13) is added to the flask. The resulting mixture is then allowed to stand for 1 hour.

Analysis of the reaction product reveals the presence of a mixture of compounds. From this mixture there is separated the organo silicon compound identified as (23) above.

EXAMPLE 2

Using the procedure described in Example 1, 1 mole of silicon tetrachloride is reacted with 3 moles (3 epoxide equivalents) of propylene oxide. Thereafter, 1 mole (1 epoxide equivalent) of glycidylacrylate is added to the reaction mixture.

Analysis of the reaction mixture indicates that the reaction mixture is composed of several different compounds. One of the compounds can be separated from the reaction mixture is the compound (24).

EXAMPLE 3

Using the procedure described in Example 1, 1 mole of silicon tetrachloride is reacted with 3 moles of propylene oxide and 1 mole of styrene oxide. The reaction product, which is a mixture of compounds, is found to contain the compound (25).

EXAMPLE 4

Using the procedure described in Example 1, 1 mole of silicon tetrachloride is reacted with 3 moles of propylene oxide and 1 mole (1 epoxide equivalent) of allyl glycidyl ether. The reaction mixture is found to contain compound (26) which can be separated therefrom in a conventional manner.

EXAMPLE 5

Using the procedure described in Example 1, 1 mole of silicon tetrachloride is reacted with 3 moles of propylene oxide and 0.5 mole (1 epoxide equivalent) of epoxide ERE 1359. The reaction product is analyzed and is found to contain a mixture of compounds. Compound (27) can be separated therefrom in a conventional manner.

EXAMPLE 6

Using the procedure described in Example 1, 1 mole of silicon tetrachloride is reacted with 3 moles of propylene oxide and 0.5 mole (1 epoxide equivalent) of epoxide DER 736. The reaction product can be used in the treatment of glass fibers without further purification, if desired.

EXAMPLE 7

Using the procedure described in Example 1, 1 mole of silicon tetrachloride is reacted with 3 moles of propylene oxide and 1 mole (1 epoxide equivalent) of glycidyl methacrylate. The reaction product is found to include compound (29) which can be separated therefrom by liquid chromatography.

EXAMPLE 8

Using the procedure described in Example 1, 1 mole of silicon tetrachloride is reacted with 3 moles of ethylene oxide and 1 mole (1 epoxide equivalent) of cresyl glycidyl ether. The product is found to include compound (30) which can be separated from the mixture in a conventional manner.

EXAMPLE 9

Using the procedure described in Example 1, 1 mole of silicon tetrachloride is reacted with 3 moles of propylene oxide and 0.5 mole (1 epoxide equivalent) of Epoxide RD 4. The product is found to include compound (34) which can be separated therefrom by liquid chromatography.

EXAMPLE 10

Using the procedure described in Example 1, 1 mole of silicon tetrachloride is reacted with 3 moles of propylene oxide and 0.5 mole (1 epoxide equivalent) of Epoxide ERR 4205. The product is found to include compound (35) which can be separated therefrom if desired.

EXAMPLE 11

Using the procedure described in Example 1, 1 mole of silicon tetrachloride is reacted with 3 moles of 1,2-butylene oxide and 0.5 mole (1 epoxide equivalent) of epoxide ERR 4221. The reaction product, which is a mixture of compounds, is found to contain compound (37) which can be separated therefrom in a conventional manner.

EXAMPLE 12

Using the procedure described in Example 1, 1 mole of silicon tetrachloride is reacted with 2 moles of propylene oxide and 2 moles (2 epoxide equivalents) of glycidyl methacrylate. The reaction product is found to contain compound (38) which can be separated, if desired.

EXAMPLE 13

Using the procedure described in Example 1, 1 mole of silicon tetrachloride is reacted with 2 moles of propylene oxide and 2 moles of Procter and Gamble Epoxide No. 7. The reaction product can be used in the treatment of glass fibers without further purification, if desired.

EXAMPLE 14

1 mole of silicon tetrachloride is reacted with 2 moles of propylene oxide and 2 moles (1 epoxide equivalent) of allyl glycidyl ether. The reaction product is found to contain compound (39) which can be separated if desired.

EXAMPLE 15

1 mole of silicon tetrachloride is reacted with 2 moles of ethylene oxide and 2 moles (2 epoxide equivalents) of phenylglycidyl ether. The reaction product is found to contain compound (40) which can be separated therefrom if desired.

EXAMPLE 16

Using the procedure described in Example 1, 1 mole of silicon tetrachloride is reacted with 2 moles of propylene oxide and 1 mole (2 epoxide equivalents) of epoxide ERE 1359. The viscous reaction product is found to include compound (42) which is separated from the mixture by liquid chromatography.

EXAMPLE 17

1 mole of silicon tetrachloride is reacted with 2 moles of propylene oxide and 1 mole (2 epoxide equivalents) of epoxide RD 4. The product is found to contain compound (44) which can be separated therefrom by conventional techniques.

EXAMPLE 18

Using this procedure described in Example 1, 1 mole of silicon tetrachloride is reacted with 2 moles of propylene oxide and 1 mole (2 epoxide equivalents) of epoxide DER 332. The reaction mixture is found to contain the compound (45) which can be separated from the mixture.

EXAMPLE 19

1 mole of silicon tetrachloride is reacted with 3 moles (3 hydroxy equivalents) of methanol and the product of this reaction is then reacted with 1 mole (1 epoxide equivalent) of glycidyl acrylate. The product of this reaction is found to be a mixture of compounds. Compound (46) can be separated from the mixture by liquid chromatography.

EXAMPLE 20

1 mole of silicon tetrachloride is reacted with 2 mole (2 hydroxy equivalents) of methanol and the product of this reaction is reacted with 1 mole (1 epoxide equivalent) of propylene oxide. The resulting product is reacted with 1 mole (1 epoxide equivalent) of glycidyl acrylate. This reaction product is found to be a mixture of compounds, one of which is identified as compound (50) which can be separated from the mixture by conventional techniques.

EXAMPLE 21

Using the procedure described in Example 19, 1 mole of silicon tetrachloride is reacted with 3 moles of allyl alcohol and the resulting product is then reacted with 1 mole of allylglycidyl ether. The crude reaction mixture, which is formed of a mixture of compounds, is found to include compound (52) which can be separated from the mixture.

EXAMPLE 22

Using the procedure described in Example 19, 1 mole of silicon tetrachloride is reacted with 3 moles of methanol and 1 mole (2 epoxide equivalents) of epoxide RD 2. The resulting product is found to contain compound (54) which can be separated from the reaction mixture, if desired.

EXAMPLE 23

Using the procedure described in Example 19, 1 mole of silicon tetrachloride is reacted with 3 moles (3 hydroxy equivalents) of ethanol amine. The resulting product is then reacted with 1 mole (1 epoxide equivalent) of cresyl glycidyl ether. The reaction product, which is a mixture of compounds, is found to contain compound (53).

EXAMPLE 24

1 mole of silicon tetrachloride is reacted with 1 mole of methanol and 1 mole of propylene oxide. Thereafter, the resulting product is reacted with 1 mole (2 epoxide equivalents) of epoxide ERR 4289.

EXAMPLE 25

1 mole of silicon tetrachloride is reacted with 3 hydroxy equivalents (3 moles) of benzyl alcohol and the resulting product is then reacted with 1 mole (2 epoxide equivalents) of epoxide ERE 1359. The product is found to contain significant amounts of compound (60).

EXAMPLE 26

1 mole of methyltrichlorosilane is reacted with 2 epoxide equivalents (2 moles) of propylene oxide. Thereafter the resulting product is reacted with 1 mole (1 epoxide equivalent) of glycidylphenyl ether. The reaction product, which contains a mixture of compounds, is subjected to analysis and found to contain compound (69) which can be separated by liquid chromatography.

EXAMPLE 27

Using the procedure described in Example 26, 1 mole of vinyltrichlorosilane is reacted with 2 epoxide equivalents (2 moles) of propylene oxide. The reaction product is then reacted with 1 mole of allylglycidyl ether. The resulting product is found to contain compound (70) in significant amounts.

EXAMPLE 28

Using the procedure described in Example 26, 1 mole of allyltrichlorosilane is reacted with 2 moles (2 epoxide equivalents) of propylene oxide and the product of this reaction is reacted with 1 mole (1 epoxide equivalent) of glycidylmethacrylate. The product is found to contain compound (72) which can be separated from the reaction mixture by conventional techniques.

EXAMPLE 29

1 mole of vinyltrichlorosilane is first reacted with 2 moles of ethylene oxide and the resulting product is then reacted with epoxide RD 2 (2 epoxide equivalents). The reaction product is found to contain compound (74) in admixture with other organo silicon compounds.

EXAMPLE 30

1 mole of vinyltrichlorosilane is reacted with 2 moles of methanol and the resulting product is then reacted with 1 mole of allylglycidyl ether. The reaction product is found to contain compound (76) in relatively high yields.

EXAMPLE 31

Using the procedure described in Example 30, 1 mole of methyltrichlorosilane is reacted with 1 mole of methanol and 1 mole of propylene oxide. The resulting product is then reacted with 1 mole of glycidylphenyl ether and the reaction product is found to contain compound (77) which can be separated by conventional techniques.

EXAMPLE 32

Using the procedure described in Example 30, 1 mole of vinyltrichlorosilane is reacted with 1 mole of methanol and 1 mole of propylene oxide. Thereafter, the reaction product is contacted with epoxide DER 332 (1 epoxide equivalent) to produce a mixture which is found to contain compound (83).

EXAMPLE 33

1 mole of vinyltrichlorosilane is reacted with 3 moles of allylglycidyl ether. The reaction product is found to contain predominantly compound (86).

EXAMPLE 34

Using the procedure described in Example 33, 1 mole of allyltrichlorosilane is reacted with 3 moles (3 epoxide equivalents) of glycidylmethacrylate. The reaction product is found to contain compound (88) which can be separated therefrom by fractional distillation.

It will be apparent from the foregoing that numerous changes and modifications can be made in the details of procedure, formulation and use without departing from the spirit of the invention, especially as defined in the following claims.

We claim:

1. Organo silicon compounds prepared by reaction of (1) a halosilane selected from the group consisting of a silane of the formula $SiX_4$ wherein X is halogen, and a compound of the formula $(R_7)_n SiX_{(4-n)}$ wherein $R_7$ is an organic group selected from the group consisting of alkyl, alkenyl, cycloalkyl and phenyl, X is halogen and n is an integer from 1 to 2, with (2) a compound selected from the group consisting of a monohydric alcohol, an alkylene oxide and a combination thereof and (3) an epoxide selected from the group consisting of an epoxide of the formula

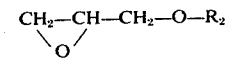

wherein $R_2$ is selected from the group consisting of phenyl and the amino, halogen and alkyl substituted derivatives thereof, alkyl, alkenyl, acrylo and methacrylo; styrene oxide; an epoxide of the formula

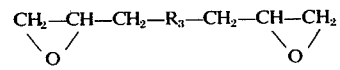

wherein $R_3$ is a divalent organic group selected from the group consisting of alkylene, alkyleneoxyalkylene, oxyalkyleneoxy, oxyalkyleneoxyalkyleneoxy, a group having the formula

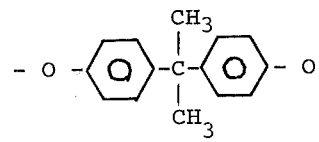

and a group having the formula

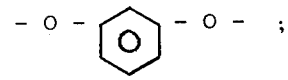

and a cyclohexane epoxide, with the ratio of the number of epoxide equivalents of (3) to the number of moles of (1) being less than 2 when the epoxide (3) contains two or more epoxy groups per mole.

2. Compounds as defined in claim 1 wherein the halosilane is $SiX_4$ and the reaction is carried out with 1 to 3 epoxide or hydroxy equivalents of said compound and 1 to 3 epoxide equivalents of (3) per mole of the halosilane.

3. Compounds as defined in claim 1 wherein X is selected from the group consisting of chlorine and bromine.

4. Compounds as defined in claim 1 wherein the halosilane is $SiX_4$.

5. Compounds as defined in claim 4 wherein said compound is an alkylene oxide.

6. Compounds as defined in claim 4 wherein said compound is a monohydric alcohol.

7. Compounds as defined in claim 4 wherein said compound is a mixture of an alkylene oxide and a monohydric alcohol.

8. Compounds as defined in claim 1 wherein the halosilane is $(R_7)_n SiX_{(4-n)}$.

9. Compounds as defined in claim 1 wherein the halosilane is $R_7 SiX_3$.

10. Compounds as defined in claim 9 wherein the reaction is carried out with 1 to 2 epoxide or hydroxy equivalents of said compound and 1 to 2 epoxide equivalents of (3) per mole of the halosilane.

11. Organo silicon compounds prepared by reaction of a halosilane of the formula $SiX_4$ wherein X is halogen with an alkylene oxide and an epoxide having the formula

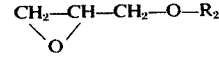

wherein $R_2$ is selected from the group consisting of phenyl and the amino, halogen and alkyl substituted derivatives thereof, alkyl, alkenyl, acryl and methacryl.

12. Compounds as defined in claim 11 wherein the reaction is carried out with 1 to 3 epoxide equivalents of the alkylene oxide and 1 to 3 epoxide equivalents of said epoxide.

13. Compounds as defined in claim 11 wherein the product includes compounds of the formula

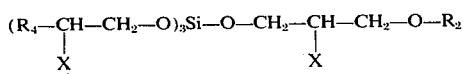

wherein $R_4$ is hydrogen or alkyl.

14. Organo silicon compounds prepared by reaction of a halosilane of the formula $SiX_4$ with an alkylene oxide and an epoxide having the formula

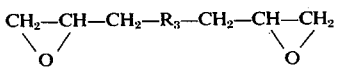

wherein $R_3$ is a divalent organic group selected from the group consisting of alkylene, alkyleneoxyalkylene, oxyalkyleneoxy, oxyalkyleneoxyalkyleneoxy, a group of the formula

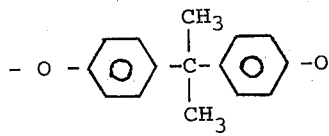

and a group of the formula

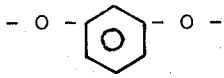

with the ratio of the number of epoxide equivalents of the epoxide to the number of moles of silane being less than 2.

15. Compounds as defined in claim 14 wherein the product contains compounds of the formula

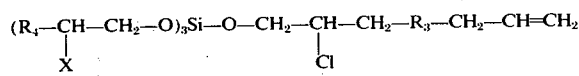

where $R_4$ is hydrogen or alkyl.

16. Compounds as defined in claim 14 wherein the product includes compounds of the formula

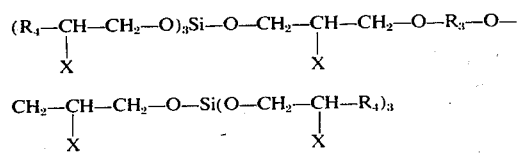

wherein $R_4$ is hydrogen or alkyl.

17. Compounds as defined in claim 16 wherein the reaction is carried out by reacting the alkylene oxide with the halosilane and then reacting the resulting product with said epoxide.

18. Organo silicon compounds prepared by reaction of a halosilane of the formula $SiX_4$ wherein X is halogen with an akylene oxide and a cyclohexane epoxide selected from the group consisting of

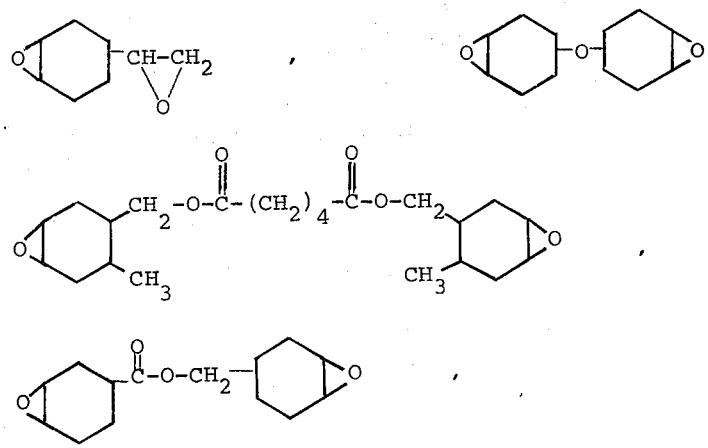

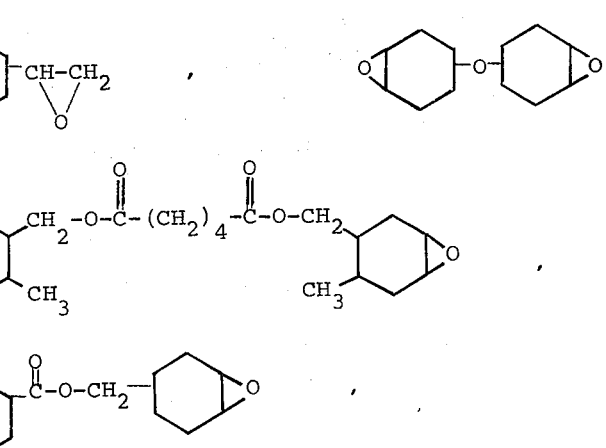

and with the ratio of the number of epoxide equivalents of the cyclohexane epoxide to the number of moles of the halosilane being less than 2.

19. Compounds as defined in claim 18 wherein the reaction is carried out with 2.1 to 3.0 epoxide equivalents of the alkylene oxide and 0.5 to 1.9 epoxide equivalents of the cyclohexane epoxide.

20. Organo silicon compounds prepared by reaction of (1) a halosilane of the formula $SiX_4$ wherein X is halogen with (2) a monohydric alcohol or a combination of a monohydric alcohol and an alkylene oxide with (3) an epoxide selected from the group consisting of an epxoide having the formula

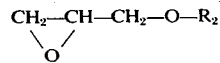

wherein $R_2$ is selected from the group consisting of phenyl and the amino, halogen and alkyl substituted derivatives thereof, alkyl, alkenyl, acrylo and methacrylo; an epoxide of the formula

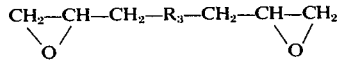

wherein $R_3$ is a divalent organic group selected from the group consisting of alkylene, alkyleneoxyalkylene, oxyalkyleneoxy, oxyalkyleneoxyalkyleneoxy, a group having the formula

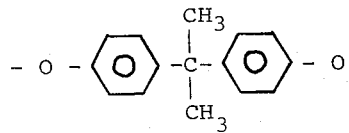

and a group having the formula

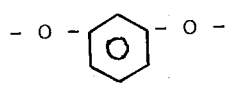

and a cyclohexane epoxide, wrlth the ratio of the number of epoxide equivalents of (3) to the number of moles of (1) being less than 2 when the epoxide (3) contains two or more epoxy groups per mole.

21. Compounds as defined in claim 20 wherein the reaction is carried out with 1 to 3 moles of the alcohol, 0 to 2 moles of the alkylene oxide and 0.5 to 3 epoxide equivalents of the epoxide per mole of halosilane.

22. Compounds as defined in claim 20 wherein the alcohol is selected from the group consisting of an alkanol, benzyl alcohol, allylalcohol and alkanol amines.

23. A compound having the formula n $$(R_4-CH-CH_2-O)_y Si(-O-CH_2-CH-CH_2-O-R_2)_n$$
$$\quad\quad\;\; | \quad\quad\quad\quad\quad\quad\quad\quad\quad\quad\;\; |$$
$$\quad\quad\; X \quad\quad\quad\quad\quad\quad\quad\quad\quad\quad\; X$$

wherein X is halogen, $R_4$ is hydrogen or alkyl, $R_2$ is selected wherein X is halogen, $R_4$ is hydrogen or alkyl, $R_2$ is selected from the group consisting of phenyl and the amino, halogen and alkyl substituted derivatives thereof, alkyl, alkenyl, acrylo and methacrylo, x is an integer from 2 to 3 and y is an integer from 1 to 2.

24. A compound as defined in claim 23 wherein $R_2$ is alkenyl.

25. A compound as defined in claim 23 wherein $R_2$ is acrylo or methacrylo.

26. A compound as defined in claim 23 wherein the compound has the formula $$(CH_3-CH-CH_2-O)_3Si-O-CH_2-CH-CH_2-O-CH_2-CH=CH_2$$
$$\quad\quad\;\; | \quad\quad\quad\quad\quad\quad\quad\quad\quad\quad\;\; |$$
$$\quad\quad\; Cl \quad\quad\quad\quad\quad\quad\quad\quad\quad\quad Cl$$

27. A compound as defined in claim 23 wherein the compound has the formula $$(CH_3-CH-CH_2-O)_3Si-O-CH_2-CH-CH_2-O-\overset{O}{\overset{\|}{C}}-\overset{R'}{\overset{|}{C}}=CH_2$$
$$\quad\quad\;\; | \quad\quad\quad\quad\quad\quad\quad\quad\quad\quad\;\; |$$
$$\quad\quad\; Cl \quad\quad\quad\quad\quad\quad\quad\quad\quad\quad Cl$$

wherein R' is hydrogen or methyl.

28. A compound as defined in claim 23 wherein the compound has the formula $$(CH_3-CH-CH_2-O)_3Si-O-CH_2-CH-CH_2-O$$
$$\quad\quad\;\; | \quad\quad\quad\quad\quad\quad\quad\quad\quad\quad\;\; |$$
$$\quad\quad\; Cl \quad\quad\quad\quad\quad\quad\quad\quad\quad\quad Cl$$

29. A compound having the formula $$(R_4-CH-CH_2-O)_3Si-O-CH_2-CH-\phi$$
$$\quad\quad\;\; | \quad\quad\quad\quad\quad\quad\quad\quad\quad\quad\;\; |$$
$$\quad\quad\; X \quad\quad\quad\quad\quad\quad\quad\quad\quad\quad X$$

wherein $R_4$ is hydrogen or alkyl and X is halogen.

30. A compound having the formula $$(R_4-CH-CH_2-O)_3Si-O-CH_2-CH-CH_2-O-R_3-O-$$
$$\quad\quad\;\; | \quad\quad\quad\quad\quad\quad\quad\quad\quad\quad\;\; |$$
$$\quad\quad\; X \quad\quad\quad\quad\quad\quad\quad\quad\quad\quad X$$

$$CH_2-CH-CH_2-O-Si(O-CH_2-CH-R_4)_3$$
$$\quad\quad\;\; | \quad\quad\quad\quad\quad\quad\quad\quad\quad\quad\;\; |$$
$$\quad\quad\; X \quad\quad\quad\quad\quad\quad\quad\quad\quad\quad X$$

wherein $R_3$ is a divalent organic group selected from the group consisting of alkylene, alkylenoxyalkylene, oxyalkyleneoxy, oxyalkyleneoxy-alkyleneoxy, a group of the formula $$-O-\phi-\underset{CH_3}{\overset{CH_3}{\overset{|}{C}}}-\phi-O-$$

and a group of the formula, $$-O-\phi-O-$$

$R_4$ is hydrogen or alkyl and X is halogen.

31. A compound as defined in claim 30 wherein the compound has the formula $$(CH_3-CH-CH_2-O)_3Si-O-CH_2-CH-CH_2-O-\phi-O-$$
$$\quad\quad\;\; | \quad\quad\quad\quad\quad\quad\quad\quad\quad\quad\;\; |$$
$$\quad\quad\; Cl \quad\quad\quad\quad\quad\quad\quad\quad\quad\quad Cl$$

$$CH_2-CH-CH_2-O-Si(O-CH_2-CH-CH_3)_3$$
$$\quad\quad\;\; | \quad\quad\quad\quad\quad\quad\quad\quad\quad\quad\;\; |$$
$$\quad\quad\; Cl \quad\quad\quad\quad\quad\quad\quad\quad\quad\quad Cl$$

32. A compound as defined in claim 30 wherein the compound has the formula $$(CH_3-CH-CH_2-O)_3Si-O-CH_2-CH-CH_2-O-\phi-$$
$$\quad\quad\;\; | \quad\quad\quad\quad\quad\quad\quad\quad\quad\quad\;\; |$$
$$\quad\quad\; Cl \quad\quad\quad\quad\quad\quad\quad\quad\quad\quad Cl$$

$$\underset{CH_3}{\overset{CH_3}{\overset{|}{C}}}-\phi-O-CH_2-CH-CH_2-Si(O-CH_2-CH-CH_3)_3$$
$$\quad\quad\quad\quad\quad\quad\quad\quad\quad\quad\quad\quad\quad\quad\quad |$$
$$\quad\quad\quad\quad\quad\quad\quad\quad\quad\quad\quad\quad\quad\quad\quad Cl$$

33. A compound selected from the group consisting of a compound having the formula $$(R_6-O)_cSi(O-CH-CH-R_4)_d(O-CH_2-CH-CH_2-O-R_2)$$
$$\quad\quad\quad\quad\quad | \quad\; | \quad\quad\quad\quad\quad\quad\quad\; |$$
$$\quad\quad\quad\quad\; R_5 \; X \quad\quad\quad\quad\quad\quad\; X$$

wherein $R_6$ is selected from the group consisting of alkyl, benzyl, allyl and aminoalkyl, $R_4$ and $R_5$ are each selected from the group consisting of hydrogen and alkyl, X is halogen, $R_2$ is selected from the group consisting of phenyl and the amino, halogen and alkyl substituted derivatives thereof, alkyl, alkenyl, acrylo and methacrylo, c is an integer from 1 to 3 and d is an integer from 0 to 2; and a compound having the formula $$(R_6-O)_c(R_4-CH-CH-O)_dSi-O-CH_2-CH-CH_2-R_3-CH_2-CH-CH_2-O-$$
$$\quad\quad\quad\quad\;\; | \quad\;\; | \quad\quad\quad\quad\quad\; | \quad\quad\quad\quad\quad\;\;\; |$$
$$\quad\quad\quad\quad\; X \;\; R_5 \quad\quad\quad\quad\; X \quad\quad\quad\quad\quad X$$

$$-Si(O-CH-CH-R_4)_d(O-R_6)_c$$
$$\quad\quad\;\; | \quad\;\; |$$
$$\quad\; R_5 \; X$$

wherein $R_3$ is a divalent organic group selected from the group consisting of alkylene, alkyleneoxyalkylene, oxyalkyleneoxy, oxyalkyleneoxyalkyleneoxy, a group having the formula $$-O-\phi-\underset{CH_3}{\overset{CH_3}{\overset{|}{C}}}-\phi-O$$

and a group having the formula $$-O-\phi-O-$$

34. A compound as defined in claim 33 wherein $R_5$ is hdrygoen.

35. Organo silicon group compounds prepared by reaction of (1) an organo silane having the formula $$(R_7)_nSiX_{(4-n)}$$

wherein $R_7$ is selected from the group consisting of alkyl, alkenyl, cycloalkyl and phenyl, X is halogen and n is an integer from 1 to 2, with (2) a compound selected from the group consisting of an alkylene oxide, a monohydric alcohol and a combination thereof and (3) an epoxide selected from the group conisting of an epoxide of the formula

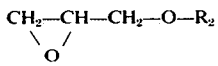

wherein $R_2$ is selected from the group consisting of phenyl and the amino, halogen and alkyl substituted derivatives thereof, alkyl, alkenyl, acrylo and methacrylo; an epoxide of the formula

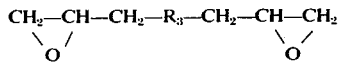

wherein $R_3$ is a divalent organic group selected from the group consisting of alkylene, alkyleneoxyalkylene, oxyalkyleneoxy, oxyalkyleneoxyalkyleneoxy, a group having the formula

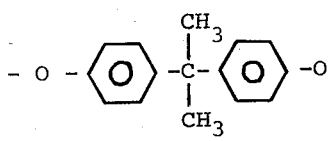

and a group having the formula

and a cyclohexane epoxide, with the ratio of the number of epoxide equivalents of (3) to the number of moles of (1) being less than 2 when the epoxide (3) contains two or more epoxy groups per mole.

36. Compounds as defined in claim 35 wherein n is 1.

37. Compounds as defined in claim 35 wherein the reaction is carried out with 1 to 2 moles of said compound and 0.5 to 3 moles of the epoxide per mole of the silane.

38. Compounds as defined in claim 35 wherein said compound is an alkylene oxide.

39. Compounds as defined in claim 35 wherein said compound is a monohydric alcohol.

40. Organo silicon compounds prepared by reaction of (1) an organo silane having the formula $(R_7)_n SiX_{(4-n)}$ wherein $R_7$ is selected from the group consisting of alkyl, alkenyl, cycloalkyl, phenyl, X is halogen and n is an integer from 1 to 2, with an epoxide selected from the group consisting of an epoxide of the formula

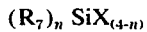

wherein $R_2$ is selected from the group consisting of phenyl and the amino, halogen and alkyl substituted derivatives thereof, alkyl, alkenyl, acrylo and methacrylo.

41. A compound selected from the group consisting of a compound of the formula

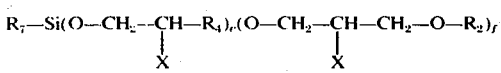

wherein $R_7$ is selected from the group consisting of alkyl, alkenyl, cycloalkyl, phenyl, X is halogen, $R_2$ is selected from the group consisting of phenyl and the amino, halogen and alkyl substituted derivatives thereof, alkyl, alkenyl, acrylo and methacrylo, e is an integer from 1 to 2 and f is an integer from the 1 to 2; and a compound of the formula

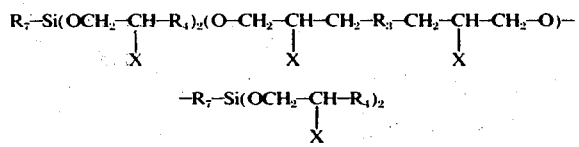

wherein $R_3$ is a divalent organic group selected from the group consisting of alkylene, alkyleneoxyalkylene, oxyalkyleneoxy, oxyalkyleneoxyalkyleneoxy, a group having the formula

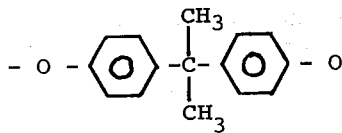

and a group having the formula

42. A compound as defined in claim 41 wherein f is 1.

43. A compound selected from the group consisting of a compound of the formula

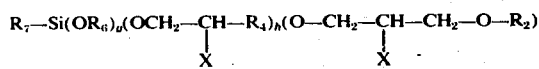

wherein $R_7$ is selected from the group consisting of alkyl, alkenyl, cycloalkyl, phenyl, X is halogen, $R_2$ is selected from the group consisting of phenyl and the amino, halogen and alkyl substituted derivatives thereof, alkyl and substituted derivatives thereof, alkenyl, acrylo and methacrylo, g is an integer from 1 to 2, h is an integer from 0 to 1, and $R_4$ is hydrogen or alkyl; and a compound of the formula

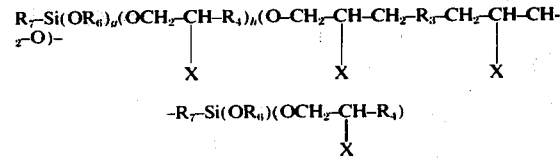

wherein $R_3$ is a divalent organic group selected from the group consisting of alkylene, alkyleneoxyalkylene, oxyalkyleneoxy, oxyalkyleneoxyalkyleneoxy, a group having the formula

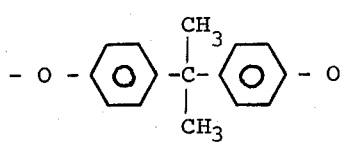

and a group having the formula

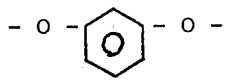

44. A compound having the formula

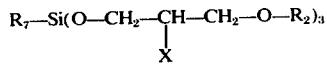

wherein $R_7$ is selected from the group consisting of alkyl, alkenyl, cycloalkyl and phenyl, X is halogen and $R_2$ is selected from the group consisting of phenyl and the amino, halogen and alkyl substituted derivatives thereof, alkyl, alkenyl, acrylo and methacrylo.

45. A compound as defined in claim 44 wherein $R_2$ is alkenyl.

46. A compound as defined in claim 44 wherein $R_2$ is a group

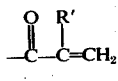

wherein R' is hydrogen or methyl.

47. A compound as defined in claim 44 wherein the compound has the formula

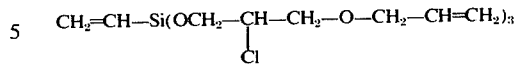

48. A compound as defined in claim 44 wherein the compound has the formula

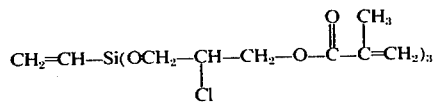

49. Organo silicon compounds prepared by reaction of silicon tetrachloride with an alkylene oxide and a compound selected from the group consisting of the compound of the formula

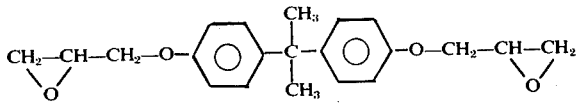

and

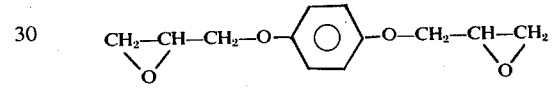

with the ratio of the number of epoxide equivalents of said compounds to the number of moles of silicon tetrachloride being less than 2.

* * * * *